United States Patent
Hu et al.

(10) Patent No.: US 7,881,287 B2
(45) Date of Patent: Feb. 1, 2011

(54) METHOD AND DEVICE FOR SESSION CONTROL IN HYBRID TELECOMMUNICATIONS NETWORK

(75) Inventors: Yun Chao Hu, Eindhoven (NL); Jos den Hartog, Capelle a/d Ijssel (NL); Rakesh Taori, Suwon (KR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 387 days.

(21) Appl. No.: 11/572,983

(22) PCT Filed: Jul. 28, 2005

(86) PCT No.: PCT/EP2005/008164
§ 371 (c)(1),
(2), (4) Date: Feb. 5, 2008

(87) PCT Pub. No.: WO2006/010614
PCT Pub. Date: Feb. 2, 2006

(65) Prior Publication Data
US 2008/0310397 A1     Dec. 18, 2008

(51) Int. Cl.
 *H04L 12/66* (2006.01)
 *H04L 12/28* (2006.01)
 *H04L 12/56* (2006.01)
(52) U.S. Cl. ............... 370/354; 370/353; 370/355; 370/356; 370/401
(58) Field of Classification Search ......... 370/352–356, 370/401
See application file for complete search history.

(56) References Cited

U.S. PATENT DOCUMENTS

| 5,675,583 | A  | * | 10/1997 | Bales et al. ............ 370/261 |
| 5,905,958 | A  | * | 5/1999 | Houde ................... 455/437 |
| 6,188,677 | B1 | * | 2/2001 | Oyama et al. .......... 370/271 |
| 7,180,863 | B1 | * | 2/2007 | Bauer et al. ............ 370/237 |
| 2005/0170863 | A1 | * | 8/2005 | Shostak ............... 455/556.1 |
| 2006/0072552 | A1 | * | 4/2006 | Shnitzer et al. ........ 370/352 |

FOREIGN PATENT DOCUMENTS

WO       WO 02/67617 A     8/2002

\* cited by examiner

*Primary Examiner*—Ronald Abelson

(57) ABSTRACT

Combinational networks may provide simultaneous connectivity over networks of different type between terminals. Communication sessions on different network types such as Circuit switched and Packet switched, belonging to the same user equipment can be correlated. In case a communication session on a circuit switched network is halted by a supplementary service e.g. at an event such as acceptance of Call Hold, a communication session on a correlated packet switched network should be halted as well. A user equipment that detects the event sends a halt message to the circuit switched network and a message to the packet switched network or a session state manager node. The session state manager node either forwards the halt-message to the packet switched network, or sends a halt-message to the packet switched network when the packet switched network does not notify that a halt has occurred.

34 Claims, 4 Drawing Sheets

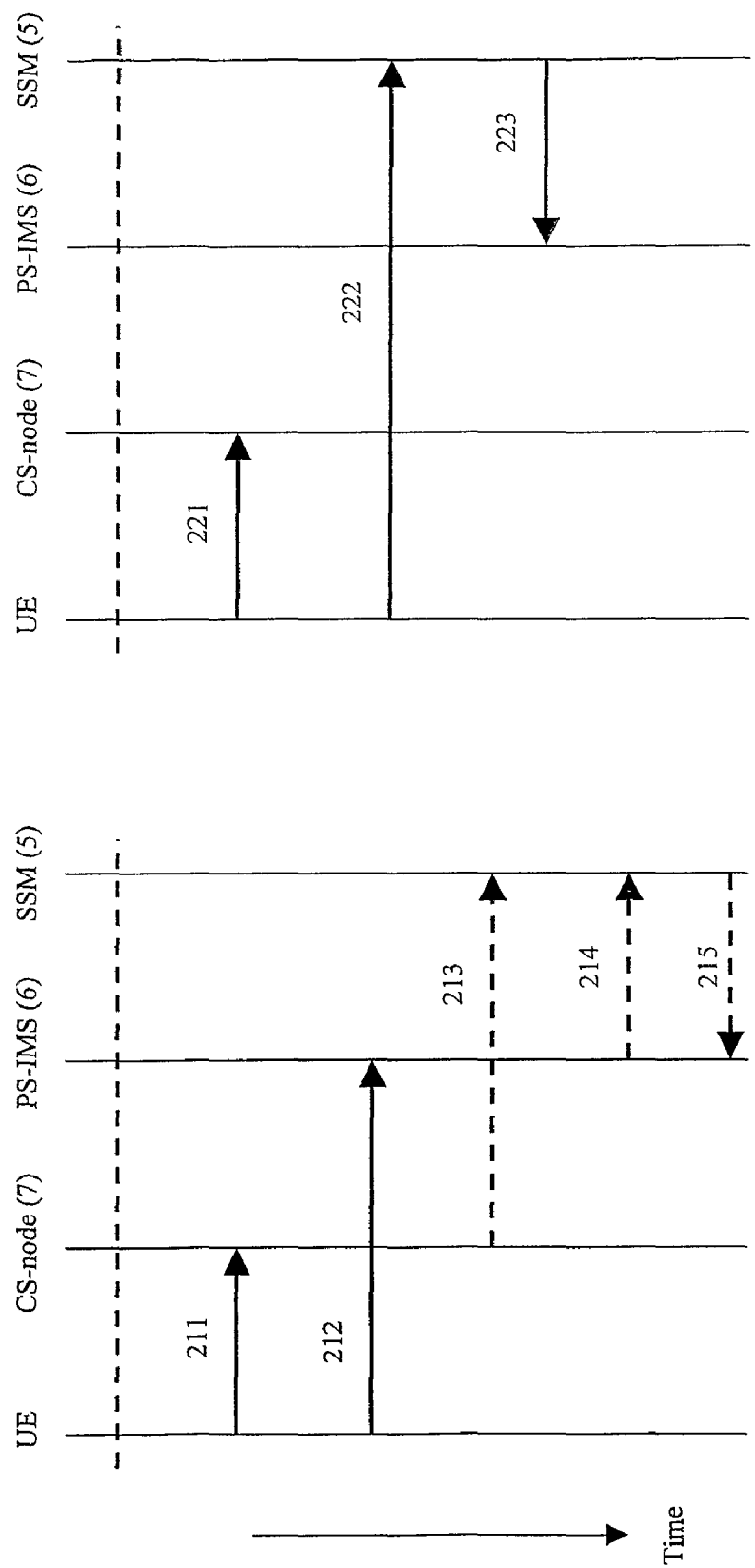

METHOD AND DEVICE FOR SESSION CONTROL IN HYBRID TELECOMMUNICATIONS NETWORK

FIELD OF THE INVENTION

The present invention relates generally to telecommunications systems, such as fixed, wireless or hybrid communication systems, having a packet- and circuit switched architecture denoted as combinational networks. More particularly, the present invention facilitates a method for controlling a communication session on a network, resulting from an event at a related communication session at another network of a different type in an efficient way.

BACKGROUND OF THE INVENTION

Fixed- and especially mobile-networks, such as Global System for Mobile communications (GSM), General Packet Radio System (GPRS) or Universal Mobile Telecommunication System (UMTS) are constantly evolving. GSM/GPRS and UMTS networks today offer both Circuit Switched (CS) connectivity and Packet Switched (PS) connectivity. The PS end-to-end connectivity with its capabilities for transmission of a wide range of data types may be used for offering multimedia services such as image, music and video transfer. The CS connectivity provides a link between two User Equipment by means of one or more trusted network-nodes with a reliable and defined Quality of Service (QoS) for e.g. voice traffic.

Combinational networks, where at least two links of at least two different network types e.g. CS or PS, to one or more User Equipment are established, are capable of deploying CS and PS connectivity simultaneously to a User Equipment, thereby enabling services, which perform their activity by PS-communication sessions, and CS communication sessions denoted as CS-calls. As this invention is presented with application of an Internet Protocol Multimedia Subsystem (IMS) service, executed as a PS-communication session, the remainder of the invention denotes the PS_communication session as an IMS-session.

As to benefit from this form of service combination, User Equipment comprising one or more terminals are required that are capable of handling a CS-call and an IMS-session simultaneously. Multi Radio Access Bearer (RAB) terminals for UMTS and Dual Transfer Mode (DTM) terminals for GSM/GPRS networks will be available; these types of terminals provide support for simultaneous CS- and PS-connectivity.

Today, conversational voice cannot be delivered over PS radio bearers to the end-user, due to e.g. insufficient capacity in the Radio Access Networks in operation and therefore existing CS bearers are used for delivering conversational voice. In the future, it may be possible that a single PS bearer is used for conversational voice and multimedia. Nevertheless, DTM terminals already-, and possibly UMTS terminals in the future, deliver support for simultaneous CS- and PS-connectivity.

In order to give the end-user the look and feel of a single service, although the service may be composed of various CS-calls and IMS-sessions, deployed in the CS-network and the PS-network respectively, it is desirable to determine and deploy some form of relation between ongoing CS-calls or CS-calls that are being established and the ongoing IMS-session(s) or IMS-session(s) that are being established. In the case that a CS-call is terminated or temporarily suspended, the related IMS-session(s) should be terminated or suspended as well as to provide the user the perception that both communication sessions are strictly related to each other and provide a combined service.

A Call Hold event is an example of an event in a CS-network that may have effect in a simultaneous and correlated IMS-session at a User Equipment. Call Hold is an example of a supplementary service in the context of Combinational Services, i.e. CS-services complemented with IMS, as defined by 3.rd Generation Partnership Project (3GPP), services, e.g. 3GPP specification TS 22.083, Call Waiting and Call Hold.

Although deploying telecommunication services such as voice, video and data, over PS networks seems to be a realistic scenario for the near future, some state of the art wireless networks e.g. GSM or UMTS, would not be able to provide the required Quality of Service (QoS) for voice traffic over a radio bearer of a PS network.

Combinational services, where the voice services are transported via the traditional CS network and the video and data services via the PS-network provide a solution with respect to referred QoS.

The CS-networks provide a number of CS-services, e.g. supplementary services, for CS-calls. Currently developed IMS applications provide a number of IMS-services for IMS-sessions available to an end-user via the PS-networks.

When an IMS service is applied within a combinational network, where the CS-call is transported via the CS-network and the IMS-sessions are transported via the PS-network, there is no relation between the CS-call provided by the CS-service and IMS session provided by the IMS-service, as the CS-call and the IMS-session are unrelated to each other due to transportation via different bearers.

3GPP specifications TS 22.083 [Call Waiting and Call Hold supplementary services, stage 1], TS 23.083 [Call Waiting and Call Hold supplementary services, stage 2], TS 24.080 [Mobile radio Layer 3 supplementary service specification; formats and coding], and TS 24.083 [Call Waiting and Call Hold supplementary services, stage 3] describe in detail a CS service Call Waiting and Call Hold. The Call Hold service allows a served mobile subscriber, who is provisioned with this Supplementary Service (SS), to interrupt communication on an existing active CS-call and subsequently, if desired, re-establish communication. A traffic channel remains assigned to the mobile subscriber after the communication is interrupted to allow the origination or termination of other calls [according to TS 22.083 stage 1].

When a Call Hold service is invoked, communication is interrupted on the traffic channel and the traffic channel is released from the existing call. The traffic channel is reserved for the served mobile subscriber invoking the Call Hold service. The served mobile subscriber has one call on hold at a time.

One traffic channel should be reserved for the served mobile subscriber as long as the subscriber has one call on hold and is currently not connected to any other call, i.e. the network should not reserve more than one traffic channel for a mobile station.

If the served mobile subscriber has a call on hold and is not connected to an active call, the subscriber either: retrieves the held call, sets up another call, or disconnects the held call.

If the served mobile subscriber has a call on hold and is not connected to an active call, the subscriber cannot receive a call, except when using the Call Waiting Supplementary Service.

If the served mobile subscriber is connected to an active call and has another call on hold, the subscriber either: alternates from one call to the other, disconnects the active call, or disconnects the held call, or disconnects both calls. If the served mobile subscriber is connected to an active call and has another call on hold, the subscriber cannot receive a call. More detailed information is comprised in 3GPP TS 22.083.

The Call Hold Supplementary Service has been specified within a CS context. At the moment of specifying this Call Hold service, there were no IMS services specified and therefore not included.

During the specification of IMS protocols and architecture it was assumed that the voice component of multimedia services would be using conversational PS-network bearers. Operator defined IMS-services may be executed by a Service Network. These IMS-services are not specified by IMS. Within IMS a number of primitives are specified which enable the Service Network to execute IMS services. There is no existence of an "IMS-session Hold service" defined within the IMS specifications in analogy towards the Call Hold service within the CS-domain.

Considering the deployment of a CS-domain service in combination with a PS-service such as IMS services, i.e. Combinational Services, a new area of service interaction between CS-domain and IMS-domain based IMS services occurred. For the combined Call Hold service, both the CS-domain service and the IMS services need to be suspended and the CS-domain- and IMS connectivity interrupted, when a Call Hold event has occurred within the CS-network.

An additional issue is the influence of the security principles within the network. In general a User Equipment is not regarded as a trusted entity within the network, although it is responsible for the initiation of a number of relevant network procedures, such as Call Hold. Therefore, a validation mechanism needs to be available that complements the User Equipment as to compensate the "untrusted" nature of the User Equipment.

SUMMARY OF THE INVENTION

It is an object of the present invention to provide a method of controlling communication sessions present in a combinational network comprising two or more networks of at least two different network types being a CS-network and at least one PS-network, on an event occurring within a CS-network where said communication sessions being a CS-call at the CS network and an IMS-session at the PS-network are related to a party having a User Equipment (UE) deploying said sessions at the networks of different network type.

The method provides control of the CS-call and the one or more IMS-sessions with Supplementary CS-domain services such as Call Hold, which CS-domain service is cooperating with an IMS service based at the IMS-domain.

It is a further object of the present invention to provide an UE and a network device, which is arranged for performing said control of the communication sessions according to the method provided.

These objects are achieved by the present invention by means of a method of providing session control within a telecommunications system comprising at least two networks of at least two different network types, where the networks are connected to a UE and a network entity, both having network connections to at least two of the networks, wherein the method provides for detecting an event, such as an accepted Call Hold, at the CS-network that requires a related IMS-session to be controlled, composing and providing a first message to the CS-network as to control the CS-call and composing and providing a second message to the PS-network as to control the one or more IMS-sessions. A device performing the detecting, the composing and the providing steps is provided as well.

The method according to the present invention is based on the insight that the UE that detects the event such as the accepted Call Hold, sends the first message to the CS-network and sends the second message to the PS-network, and expects the appropriate action from the CS-network and the PS-network. The appropriate action is to be applied on an ongoing correlated communication IMS-session at the PS-network. In a first solution a session state manager node receives a notifications from the CS-network and the PS-network that the action is performed. In case the notification of the PS-network does not arrive (in time) the session state manager node sends the PS-network the second message. In a second solution the second message is sent by the UE to the PS-network via the session state manager node.

The method provides that the session state manager node is triggered to control a IMS-domain based service in an appropriate predetermined way, such as interrupt, resume or terminate or to forward The method provides a network entity that keeps session state information within the network such that applications on a service layer are provided with means to interrogate the session state of an ongoing combinational service.

Deployment of the invention as presented enables that e.g. the invocation of a Call Hold service within the CS- and/or IMS-network shall trigger a session state update towards the mentioned session state manager node containing the session state information.

These and other embodiments according to the present invention are now illustrated in more detail with reference to the enclosed drawings.

BRIEF DESCRIPTION OF THE DRAWINGS

FIG. 2A presents a time sequence diagram of the message flows between an UE, a CS-domain network session node, an IMS-domain network session node and a session state manager node where the UE messages the IMS-domain network session node for a Call Hold.

FIG. 2B presents a time sequence diagram of the message flows between an UE, a CS-domain network session node, an IMS-domain network session node and a session state manager node where the UE messages the IMS-domain network session node for a Call Hold via the session state manager node

DETAILED DESCRIPTION

Without restrictions to the scope of the invention, in order to provide a thorough understanding of the present invention, the invention is presented against the background and within the scope of the current implementation of mobile communication system deployed in a combinational network environment. However, the present invention may be deployed in any communication system comprising combinational networks.

Suppose that two users, A-party and B-party have communication sessions ongoing. Said communication sessions between the A-party and the B-party consist of a CS-call provided by the CS-network and an IMS-session provided by the PS-network, both communication sessions regarded as "communication components". UE used by the A-party and UE used by the B-party shall allow for CS and PS communications sessions simultaneously, which is referred to as dual-mode communication. The said dual-mode communication capability may be present in a single device or in a multitude of devices, such as a split UE arrangement where said dual-mode UE comprises e.g. a mobile phone and a Personal Computer (PC).

Messages exchanged between said parties to establish communication and/or messages exchanged during communication can be intercepted and modified by a "Service Network" comprising network entities having connections to networks of at least two different network types within the combinational network.

Figure 1:
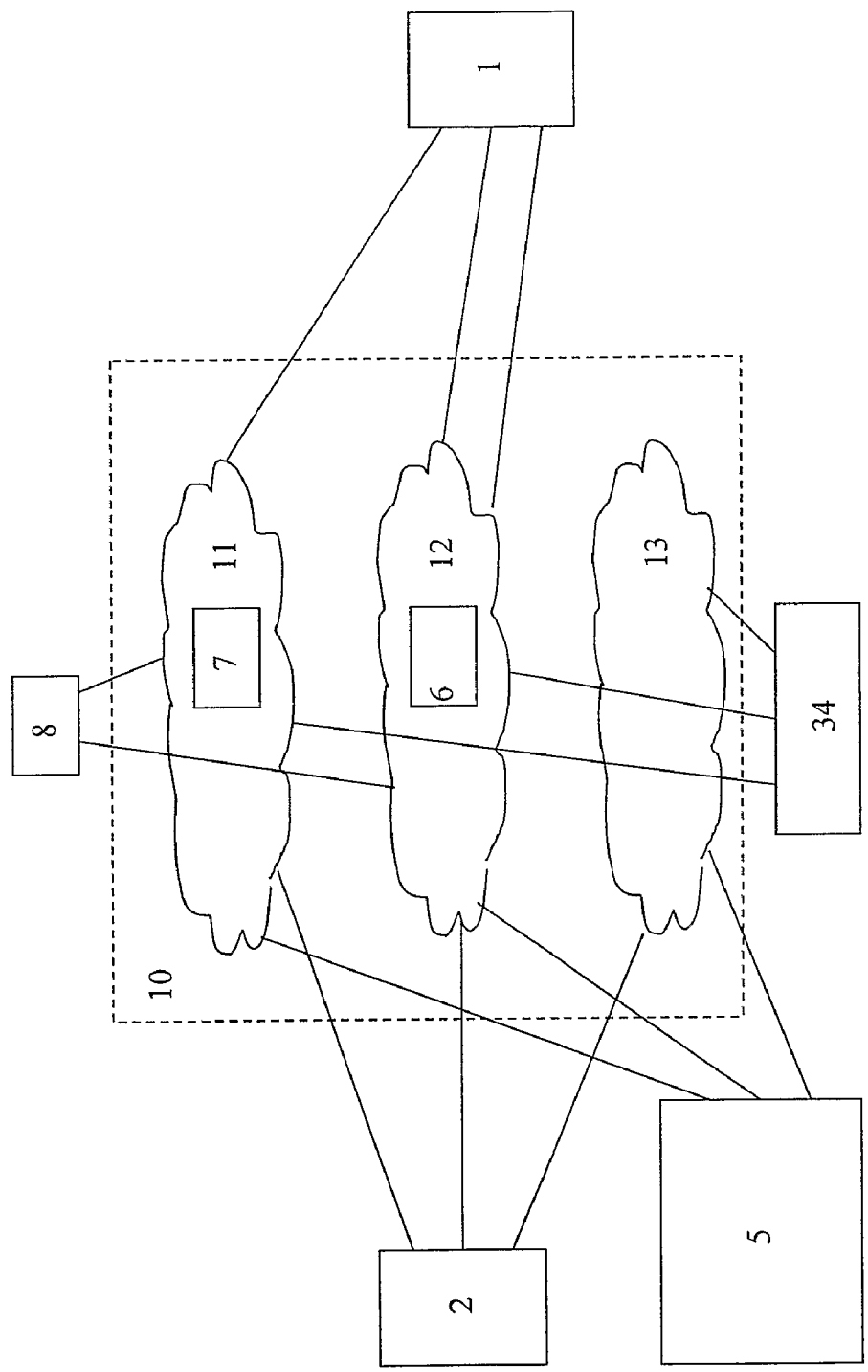
FIG. 1 presents a schematic diagram of a combinational network with two UE connected to the combinational network.

FIG. 1 illustrates schematically a network with several network entities 1, 2, 5, 8, 34 and a combinational network 10 comprising several networks of at least two different network types 11, 12, 13, with a first UE 1 and a second UE 2 connected to all or at least two of the networks 11, 12, 13.

As to provide a physical connection to the networks 11, 12, 13, the UE 1, 2 has network interfaces each associated with a network address, towards said networks 11, 12, 13.

For the explanation of the invention, it is arbitrarily assumed that network 11 is a network of a CS-network type, and networks 12 and 13 are networks of a PS-network type. The combination of the CS-network 11 with CS-services is regarded as a CS-domain, and the combination of the PS-network 12, 13 with IMS-services is regarded as an IMS-domain.

In the description below, it will be explained how an event during a CS-call occurring within the CS-network 11 results in an appropriate action at a correlated IMS-session within the PS-network 12, 13. Without any restriction to the scope of the invention a Call Hold event will be used to elucidate the method proposed by the invention.

The invention addresses three closely related solutions to a problem of controlling correlated communication sessions in the combinational network 10 by means of introduction of a network entity named "session state manager" node 5.

The solutions described assume that the A-party UE 1 and the B-party UE 2 have an ongoing CS-call connectivity to each other via the CS-network 11 and a related ongoing IMS session to each other via the PS-network 12, 13. The explanation below describes a single ongoing IMS-session at the PS-network 12, 13, however a multiple of simultaneous IMS-sessions at the same or multiple PS-networks 12, 13 is deployed in the same way as a single IMS-session provided by the PS-network 12, 13.

Network entity 34, implemented as a content server, is connected to the networks 11, 12, 13 and may just as UE 2 have related simultaneous communication sessions over the networks 11, 12, 13 with UE 1. Although the invention is explained in the case that UE 1 and UE 2 have correlated communication sessions, the case that UE 1 has correlated communication sessions to content server 34 would be included by the invention as well.

FIG. 1 also shows network entities comprised in combinational network 10, such as network session nodes 6, 7.

A CS-domain network session node 7 is comprised in the CS-domain, and is arranged to receive messages from the UE 1, 2 or network entity 34.

This CS-domain network session node 7 is arranged to have the CS-network 11 execute an event such as a Call Hold for the CS-connection between the A-party's UE 1 and the B-party's UE 2 and a Call Establishment for the A-party's UE 1 and the C-party's UE. The CS-domain network session node 7 is arranged to notify—or to provide an event message to—a session state manager 5, as to enable the session state manager node 5 to perform an appropriate action towards the IMS-domain. The action could be e.g. an interruption or termination of an ongoing IMS-session at the IMS-domain in response to the event occurring in the CS-domain.

Furthermore the CS-domain network session node 7 is arranged to generate an event such as a Call Hold, which event is to be detected by the UE 1, 2 or content server 34.

The CS-domain network session node 7 may also be arranged to receive a message, based on an event generated by another network node.

An IMS-domain network session node 6 is comprised in the IMS-domain, and is arranged to receive messages from the UE 1, 2 or network entity 34.

This IMS-domain network session node 6 is arranged to interpret said message and accordingly interrupt or terminate an ongoing IMS-session between the A-party's UE and the B-party's UE or the content server 34 on request of the UE 1, 2, the content server 34 or the session state manager 5. Apart from interrupting or terminating the ongoing IMS-session, the IMS-domain network session node 6 suspends, resumes, delays, accelerates or increases/decreases a bandwidth of a bearer of the PS-network.

The IMS-domain network session node 6 is arranged to notify—or to provide an event message to—a session state manager 5, as to inform the session state manager node 5 on the actual state of the IMS session(s).

Furthermore the IMS-domain network session node 6 is arranged to generate an event such as an IMS-session "Hold", which event is to be detected by the UE 1, 2 or content server 34.

The IMS-domain network session node 6 may also be arranged to receive a message, based on an event generated by another network node.

The message received by the IMS-domain network session node 6 may comprise a timestamp and the IMS-domain network session node 6 is arranged to synchronise the terminating- or the suspending-action with the timestamp.

The IMS-domain network session node 6 has the capability to defer the execution of a suspension or a termination of the IMS-session in progress until the IMS-session is completed. The defer action takes place on receiving the message.

The IMS-domain network session node 6 may be implemented as an IMS-server.

An external network node 8, located outside the networks 11, 12, 13 having connections to the networks 11, 12, may also generate the event that will, when detected, effect the resulting actions by the CS-domain or IMS-domain network session nodes 6, 7.

The session state manager node 5 is arranged to:

receive notifications from the CS-domain network session node 7 and the IMS-domain network session node 6 that a "Hold" in the respective CS-call or IMS-session has occurred.

receive an IMS-session Hold message or a Call Hold event message from the UE 1, 2 or content server 34.

receive a Call Hold event message from the A-party's UE 1, the B-party's UE 2 or the content server 34.

send a Call Hold event message or IMS-session Hold message to the IMS-domain network session node 6.

Keep CS-call- and IMS-session-state information within the network such that applications on a service layer are provided with means to interrogate the session state of an ongoing combinational service.

Furthermore the session state manager node may generate the event.

The session state manager has knowledge of related CS-call and IMS sessions and has the ability to check on a correlation for said CS-calls and PS-sessions according to prior art methods.

A first solution is based on sending of an IMS-session Hold message by the UE 1, 2, towards to the IMS-domain network session node 6. The PS-network 12, 13 will inform a session state manager node 5 by means of a PS-network notification that an IMS session between the A-party UE 1 and the B-party UE 2 has been put on hold. In addition to the mentioned PS-network notification, the session state manager node 5 will also be updated by a notification from the CS-network 11, indicating that the CS connection between the A-party UE 1 and the B-party UE 2 has been put on hold.

With reference to FIG. 2A the first solution is explained. Suppose that the A-party's UE 1 receives a terminating call attempt from a C-party's UE, while the A-party's UE 1 has a correlated ongoing CS-call and an ongoing IMS-session towards the B-party's UE 2. The A-party decides to accept the call from the C-party and puts the CS-call with the B-party on hold. According to prior art methods the A-party's UE 1 sends a Call Hold message 211 to the CS-domain network session node 7 as to have the CS-network execute a Call Hold for the CS connection between the A-party's UE 1 and the B-party's UE 2. The invention provides in this first solution that the A-party's UE sends as well an IMS-session Hold message 212 to the IMS-domain network session node 6 to put the IMS-session between the A-party's UE 1 and the B-party's UE 2 on hold. Both the CS-domain network session node 7 and the IMS-domain network session node 6 notify 213, 214 the session state manager node 5 that their respective sessions between the A-party's UE 1 and the B-party's UE 2 have been set on hold.

This first solution is based on the sending of an IMS-session Hold message 212 by means of the UE 1, 2 to IMS-domain network session node 6. The PS-network 12, 13 will notify 214 a session state manager node 5 that the IMS session between the A-party's UE 1 and the B-party's UE 2 has been put on hold. In addition to the mentioned IMS network notification, the session state manager node 5 will also be updated by a notification 213 from the CS-network 11, indicating that the CS connection between the A-party UE 1 and the B-party UE 2 has been put on hold. In this way session state manager node 5 has a complete overview of the actual state of the sessions at the networks 11, 12, 13.

In the case that the UE 1 did not for any reason sent the IMS-session Hold message 212 towards the IMS-domain network session node 6, such that a notification that the IMS-session is halted is not received in a time interval Δt after having received a notification 213 that the CS session has been set on hold, the session state manager notifies 215 the IMS-domain network session node 6 to halt the ongoing IMS-session.

As an extension to this first solution, the IMS-domain network session node 6 will, after receiving the IMS-session Hold message 212 from the A-party's UE 1, instead of suspending the ongoing IMS session immediately, either:

a) synchronise the IMS-session Hold action with a timestamp comprised in the second message.

b) maintain the ongoing IMS-session until the ongoing session is completed.

With reference to FIG. 2B a second solution is explained. Suppose that the A-party's UE 1 receives a terminating call attempt from a C-party's UE, while the A-party's UE 1 has a correlated ongoing CS-call with an ongoing IMS-session towards a B-party's UE 2. The A-party decides to accept the call from the C-party and puts the CS-call with the B-party on hold. According to prior art methods the A-party's UE 1 sends a Call Hold message 221 to the CS-domain network session node 7 as to have the CS-network execute a Call Hold for the CS connection between the A-party's UE 1 and the B-party's UE 2. The invention provides in this second solution that the A-party's UE 1 sends a Call Hold event message 222 towards the session state manager node 5 as to indicate that the CS-call between the A-party's UE 1 and the B-party's UE 2 has been put on hold. By sending this Call Hold event message 222, the UE 1 expects that the session state manager node 5 performs a hold of the IMS-session.

The A-party's UE 1 sends this Call Hold event message 222 via either the CS-network 11 or the PS network 12, 13, as the UE 1 is connected to (at least) both network types of the networks (11, 12, 13).

In response to the received Call Hold event message from the UE 1, the session state manager node 5 will send a Call Hold event message 223 to the IMS-domain network session node 6 as Do indicate that the CS-call between the A-party's UE 1 and the B-party's UE 2 has been put on hold. Subsequently the IMS-domain network session node 6 suspends the IMS session between the A-party's UE 1 and the B-party's UE 2.

In this second solution the UE 1, 2 has a connection via CS-network 11 or via PS-network 12, 13 towards the session state manager node 5 and informs 222 the session state manager node 5 when it initiates a Call Hold request to the CS-domain. The session state manager node 5 updates its session state information and notifies 223 the IMS-domain to break the IMS connectivity between the A-party's UE 1 and the B-party's UE 2.

As an extension to this second solution, the IMS-domain network session node 6 will, after receiving the message 223 from the session state manager node 5, instead of suspending the ongoing IMS session immediately, either:

a) synchronise the IMS-session Hold action with a timestamp comprised in the second message.

b) maintain the ongoing IMS-session until the ongoing session is completed.

Figure 2C:
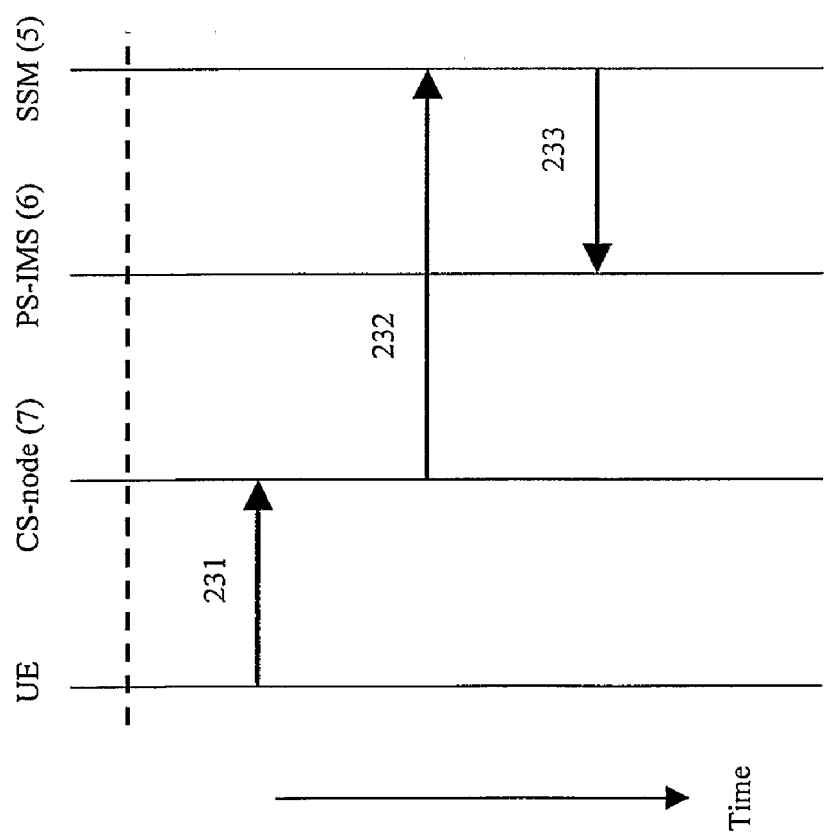
FIG. 2C presents a time sequence diagram of the message flows between an UE, a CS-domain network session node, an IMS-domain network session node and a session state manager node where the UE messages the CS-domain network session node for a Call Hold, and where this CS-domain network session node messages the session state manager that a call is established between two parties, denoted as an A-party and a C-party, intentionally to have the session state manager node request the IMS-domain network session node to hold the IMS-session.

With reference to FIG. 2C a third solution is explained as an alternative to the cases where the UE 1 is sending a first and a second CS/IMS Hold message to the CS-domain network session node 7 and the IMS-domain network session node 6 respectively. In this alternative the UE is sending only one message.

Suppose that the A-party's UE 1 receives a terminating call attempt from a C-party's UE, while the A-party's UE 1 has a correlated ongoing CS-call with an ongoing IMS-session towards a B-party's UE 2. The A-party decides to accept the CS-call from the C-party and puts the CS-call with the B-party on hold.

According to prior art methods the A-party's UE 1 sends a call hold message 231 to a CS-domain network session node 7 as to have the CS-network execute a Call Hold for the CS connection between the A-party's UE 1 and the B-party's UE 2. The invention provides in this third solution that the CS-domain network session node 7 sends a CS-domain event message 232 to the session state manager node 5 as to indicate an accepted call from the C-party by the A-party's UE 1. Subsequently the session state manager node 5 informs the IMS-domain about the CS-domain Call Hold by sending an IMS notification 233 containing an instruction that the IMS session between the A-party's UE 1 and the B-party's UE 2 shall be suspended. The IMS-domain network session node 6 suspends the IMS-session after the message 233 has been received from the session state manager node 5. This suspension of the IMS-session is optionally executed such that the actual suspension is delayed until the IMS-session in progress has ended, or that the interruption is synchronised with a timestamp provided by the notification of the session state manager 5.

In this third solution the CS-domain network session node 7 notifies 232 the session state manager node 5 that a connection has been established between the A-party's UE 1 and a C-party's UE. The session state manager node 5 realises that the A-party's UE 1 was already engaged within a combinational session with the B-party's UE 2, and will notify the PS-network 12, 13 that the PS connectivity between the A-party's UE 1 and the B-party's UE 2 needs to be interrupted.

As an extension to this third solution, the IMS-domain network session node 6 will, after receiving the message 233 from the session state manager node 5, instead of suspending the ongoing IMS session immediately, either:

a) synchronise the IMS-session Hold action with a timestamp comprised in the second message.

b) maintain the ongoing IMS-session until the ongoing session is completed.

Figure 3:
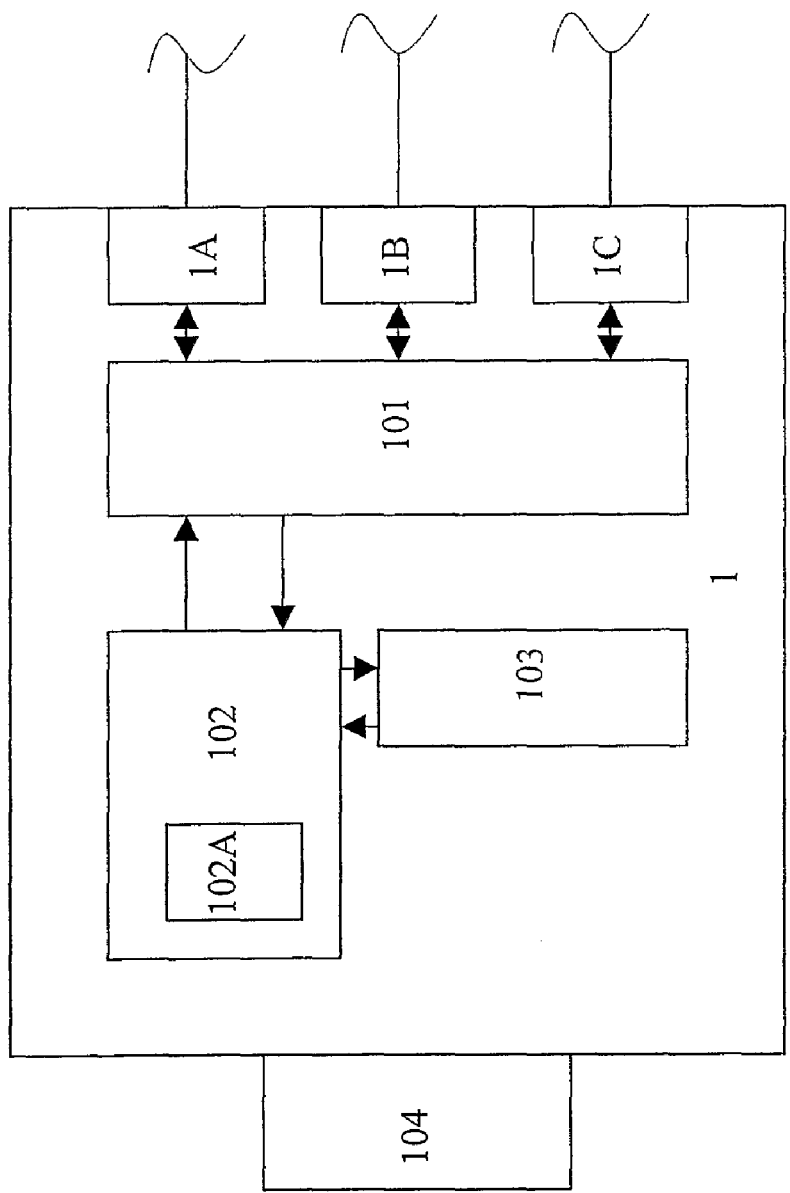
FIG. 3 presents a schematic diagram of a part of a communication device such as a UE.

With reference to FIG. 3, representing schematically a part of a communication device such as a UE, the UE 1, 2 will be explained.

The UE 1, 2 comprises an Input Output (I/O) unit 101 connected to the networks 11, 12, 13, by means of interfaces 1A, 1B, 1C, each with a network address. The event whereupon the Call Hold and IMS-session Hold are, might be generated by the UE 1, 2 or be received by the I/O unit 101. The I/O unit 101 may also receive the event from another network entity 2, 5, 8, 34, and sends the first- and second-message via the interfaces 1A, 1B, 1C. The UE 1, 2 comprises a memory unit 103 that is arranged for storing the event and the messages.

The processing unit 102 with application program storage 102A for an application programme, is arranged for detecting the event, composing the first- and second-message, based on the event, according to predetermined rules and parameters, such as time of the day or a subscriber profile. The application programme is an IMS application.

The UE 1, 2 is implemented as a terminal such as a Dual Transfer Mode (DTM) terminal, a Global System for Mobile communications-General Packet Radio System (GSM-GPRS) terminal or a Universal Mobile Telecommunication System Multi Radio Access Bearer (UMTS Multi-RAB) terminal.

If the UE 1, 2 is implemented as a split terminal environment, the CS connection is accomplished by terminals such as a telephone, a headset, a Global System for Mobile communications (GSM) terminal, an Advanced Mobile Phone System (AMPS), a Digital AMPS (D-AMPS) terminal, Digital Enhanced Cordless Telephony (DECT) terminal, Bluetooth terminal or a Universal Mobile Telecommunication System (UMTS) terminal. In the split terminal the PS connectivity is accomplished by a terminals such as a video terminal, a Personal Computer (PC) or workstation. Input means 104 of UE 1 provides a way to initialise the event at the UE 1, 2.

Implementation of the invention is provided by deploying prior art network entities, such as a Mobile Switching Center (MSC) as CS-domain network session node 7 and a Session Initiation Protocol-application server (SIP-AS) as IMS-domain network session node 6.

The messages types and network addresses used between the UE 1, 2, 34, the network session nodes 6, 7 and the session state manager node 5, are prior art messages types and addresses, depending on the network type.

The session state manager node 5 reflects the status of a multimedia session within the combinational network. The CS-call and the PS-session are correlated. In case the session manager node 5 would need to check if a correlation exists, a method disclosed at co-pending application U.S. 60/592,426 may be used. This co-pending application shows a method where a number of logical databases is introduced which contain actual data on relations between network addresses and communication sessions, where a correlation check is deployed by a correlation node. The check consists of a number of queries towards said databases or to other network entities, yielding whether the communication session is to be regarded as combinational. The correlation node, which establishes that the communication sessions are present, determines a correlation between the communication sessions and provides the determined correlation to a subsystem. The establishing of the presence of the communication sessions comprises the steps of retrieving the network addresses of the first User Equipment and the network entity via a CS-network and via a PS-network, and verifying the presence of the communication sessions on both network types.

The session state manager node 5 reflects the status of a multimedia session within the combinational network where network addresses of CS-network type and PS-network type of the UE 1, 2 are available. In case the session state manager node 5 needs to retrieve a PS-network type network address of the UE 1, 2 a method disclosed at co-pending application U.S. 60/592,427 may be used. This co-pending application shows a method and device for retrieving the PS address of a circuit switched call partner, where a retrieval for a PS network address is initialised by means of a CS protocol via a CS-network. The address retrieval request is directed to the CS call partner or a network service that accomplishes the network address request. The request is received by the CS-call partner's User Equipment and the PS-network address is looked up and sent back to the requesting User Equipment Combinational Services are currently being standardised by 3GPP. The reuse of CS infrastructure allows for stepwise introduction of IMS services without the need for major investment by the operator. Another aspect will be the introduction of new advanced Multimedia services to the call and therefore introducing an enriched user experience of the basic communication needs (i.e. making calls).

A number of services are quite commonly used by users in the context of voice calls, e.g. supplementary services. However, in the context of enriched voice services the handling of the supplementary services is becoming an issue. The present invention provides a solution by introducing the session state manager node 5 in cooperation with the network session nodes 6, 7, for controlling sessions in the context of combinational services once the supplementary service such as a Call Hold is invoked.

The invention as presented provides a control method for a related CS-call and IMS-session in a combinational context. By deployment of the invention, invocations of CS-domain supplementary services are able to influence the associated IMS services and may e.g. temporarily suspend the IMS connectivity in a convenient and efficient way.

As in each solution presented, the session manager node 5 has a checking (solution 1) or an active (solution 2, 3) role, and hence is involved and has influence in a process of controlling the IMS-session. This session manager node 5 is regarded as a trusted network entity and is potentially capable to detect and correct any action of the UE 1, 2 that initialised the event. The inclusion of the trusted session manager node 5 according to the invention allows the use of an UE that is regarded as untrusted.

What is claimed is:

1. A method for providing session control within a telecommunications system comprising at least two networks of at least two different network types, where the networks are connecting at least a first user equipment and a network entity, where the first user equipment and the network entity have network connections to at least two of the networks of different network type, the method comprising the steps of:
    detecting a Call Hold event or a termination event within a first communication session, said communication session being present on the network of a first network type;
    composing a first message based on said event;
    providing the first message to a network node comprised within the network of the first network type so as to control the first communication session,
    composing a second message based on said event,
    providing the second message to a network node, so as to control a second communication session, being present on the network of a second network type; wherein the first and the second communication session are present simultaneously on the networks of the different network types and where the first and the second communication sessions are combinational; and
    based on the event and the second message associated with the event, synchronizing a holding action or terminating action at the IMS server with a timestamp comprised in the second message.

2. The method according to claim 1, wherein the detecting step, the composing steps and the providing steps are performed by the first user equipment.

3. The method according to claim 1, wherein the detecting step, the composing steps and the providing steps are performed by the network entity.

4. The method according to claim 1, wherein the event is generated by the first user equipment or the network entity.

5. The method according to claim 1, wherein the event is generated by a first network session node comprised by the network of the first type.

6. The method according to any of claim 1, wherein the network node is a session state manager node or a second network session node in the network of the second type.

7. The method according to claim 6, wherein the event is generated by the session state manager node.

8. The method according to claim 6, wherein the event is generated by the second network session node.

9. The method according to claim 6, wherein the event is generated by an external node.

10. The method according to claim 5, wherein the first message is provided to the first network session node.

11. The method according to claim 6, wherein the second message is provided to the second network session node.

12. The method according to claim 6, wherein the second message is provided to the session state manager node which forwards the second message to the second network session node.

13. The method according to claim 6, wherein the second network session node suspends or resumes the second communication session on reception of the second message.

14. The method according to claim 6, wherein the second network session node delays or accelerates the second communication session on reception of the second message.

15. The method according to claim 6, wherein the second network session node increases or decreases a bandwidth of the network of the second type.

16. The method according to claim 6, wherein the second network session node terminates the second communication session after a predetermined time delay on reception of the second message.

17. The method according to claim 1 wherein the network entity is a second user equipment or a network service node.

18. The method according to claim 1, wherein the first and the second user equipment comprise a terminal: a Dual Transfer Mode (DTM) terminal, a Global System for Mobile communications-General Packet Radio System (GSM-GPRS) terminal or a Universal Mobile Telecommunication System Multi Radio Access Bearer (UMTS Multi-RAB) terminal, with at least one connection to each connected network.

19. The method according to claim 1, wherein the first or the second user equipment comprise two or more terminals where each of the terminals has at least one connection to each connected network.

20. The method according to claim 19 where the terminals are capable of deploying a communication session, by means of a telephone, headset, Global System for Mobile communications (GSM) terminal, Advanced Mobile Phone System (AMPS) or Digital AMPS (D-AMPS) terminal, Digital Enhanced Cordless Telephony (DECT) terminal, Bluetooth terminal, Universal Mobile Telecommunication System (UMTS) terminal, video terminal, Personal Computer (PC) or workstation.

21. The method according to claim 18 where the terminal has a wire-line connection to the network or a wireless connection to the network.

22. The method according claim 1 wherein the networks are of a Circuit Switched (CS) type and Packet Switched (PS) type.

23. The method according to claim 22 wherein an Internet Protocol Multimedia Subsystem (IMS) application at the first user equipment or at the network entity is utilized for detecting the event and providing the first- and second-message.

24. The method according to claim 22 wherein the second network session node is an IP Multimedia Subsystem (IMS) server, adapted for controlling the second communication session on reception of the second message.

25. The method according to claim 24, wherein the IMS server maintains the first or second communication session when the event is a Call Hold or Call Terminate, until the session in progress is completed.

26. A communication device for operation in a telecommunication system, where the system comprises at least two networks, of at least two different network types, the networks are connecting at least a first user equipment and a network entity the first user equipment and the network entity have network connections, each connection associated with a network address, to at least two of the networks, and the user equipment comprises an Input Output unit communicatively connected to the networks, by means of interfaces, each interface having a network address, for receiving an event and sending a first message and a second message via the interfaces, a memory unit for storing said event and messages, and a processing unit with application program storage, the communication device comprising:

means fort composing the first and the second message, based on the event, where the event is detected within a first communication session being present on the network of a first network type, the first message being sent to a network node comprised within the network of the first network type so as to control the first communication session, the second message is sent to a network node, so as to control a second communication session, being present on the network of the second network type, the first and the second communication session being present simultaneously on the networks of the different network types;

the first and the second communication sessions are combinational; and means for synchronizing a holding action or terminating action at the IMS server with a timestamp comprised in the second message, based on the event and the second message associated with the event.

27. The communication device according to claim 26, wherein the processing unit with application program storage composes the first- and the second-message according to predetermined rules and parameters.

28. The communication device according to claim 26, wherein the first user equipment comprises a terminal; a Dual Transfer Mode (DTM) terminal, a Global System for Mobile communications-General Packet Radio System (GSM-GPRS) terminal or a Universal Mobile Telecommunication System Multi Radio Access Bearer (UMTS Multi-RAB) terminal, with at least one connection to each connected network where each of said connections has a network address.

29. The communication device according to claim 26, wherein the user equipment comprises two or more terminals where each of the terminals has at least one connection to each connected network and where each of said connections has a network address.

30. The communication device according to claim 28 where the terminals are capable of deploying a communication session by means of a telephone, headset, Global System for Mobile communications (GSM) terminal, Advanced Mobile Phone System (AMPS) or Digital AMPS (D-AMPS) terminal, Digital Enhanced Cordless Telephony (DECT) terminal, Bluetooth terminal, Universal Mobile Telecommunication System (UMTS) terminal, video terminal, Personal Computer (PC) or workstation.

31. The communication device according to claim 28 where the terminal has a wire-line connection to at least one of the networks or a wireless connection to at least one of the networks.

32. The communication device according to claim 26, wherein the networks and associated network addresses are of a Circuit Switched (CS) type and Packet Switched (PS) type.

33. The communication device according to claim 28 wherein the terminal has input means where the event is generated.

34. The communication device according to claim 28 wherein the terminal is arranged for executing an IP Multimedia Services (IMS) session.

* * * * *

UNITED STATES PATENT AND TRADEMARK OFFICE
CERTIFICATE OF CORRECTION

PATENT NO.        : 7,881,287 B2
APPLICATION NO.   : 11/572983
DATED             : February 1, 2011
INVENTOR(S)       : Hu et al.

It is certified that error appears in the above-identified patent and that said Letters Patent is hereby corrected as shown below:

In Column 1, Line 40, delete "PS_communication" and insert -- PS-communication --, therefor.

In Column 4, Line 21, delete "forward" and insert -- forward. --, therefor.

In Column 4, Line 50, delete "node" and insert -- node. --, therefor.

In Column 8, Line 30, delete "Do" and insert -- to --, therefor.

In Column 9, Line 38, delete "Input Output" and insert -- Input/Output --, therefor.

In Column 10, Line 48, delete "Equipment" and insert -- Equipment. --, therefor.

In Column 11, Line 51, in Claim 6, delete "to any of claim" and insert -- to claim --, therefor.

In Column 12, Line 61, in Claim 26, delete "Input Output" and insert -- Input/Output --, therefor.

In Column 13, Line 1, in Claim 26, delete "fort" and insert -- for --, therefor.

In Column 13, Line 24, in Claim 28, delete "terminal;" and insert -- terminal: --, therefor.

Signed and Sealed this
Twenty-third Day of August, 2011

David J. Kappos
*Director of the United States Patent and Trademark Office*